United States Patent
Sevi et al.

(10) Patent No.: US 7,117,682 B1
(45) Date of Patent: Oct. 10, 2006

(54) TURBOJET AXISYMMETRIC NOZZLE CONTROLLED HOT FLAP SHUTTER

(75) Inventors: Guillaume Sevi, Ivry sur Seine (FR); Stephane Blanchard, Chartrettes (FR); Thierry Pancou, Saintry sur Seine (FR)

(73) Assignee: Snecma Moteurs, Paris (FR)

( * ) Notice: Subject to any disclaimer, the term of this patent is extended or adjusted under 35 U.S.C. 154(b) by 72 days.

(21) Appl. No.: 10/941,806

(22) Filed: Sep. 16, 2004

(30) Foreign Application Priority Data

Sep. 19, 2003 (FR) .................................. 03 50577

(51) Int. Cl.
*F02K 1/00* (2006.01)
(52) U.S. Cl. ................ 60/771; 60/770; 239/265.35
(58) Field of Classification Search ............. 60/770, 60/771, 228; 239/265.19, 265.33, 236.35, 239/265.39
See application file for complete search history.

(56) References Cited

U.S. PATENT DOCUMENTS

| | | | | |
|---|---|---|---|---|
| 4,128,208 A | * | 12/1978 | Ryan et al. | ............ 239/265.39 |
| 4,637,550 A | | 1/1987 | Nash | |
| 4,641,783 A | | 2/1987 | Camboulives | |
| 4,878,618 A | * | 11/1989 | Hufnagel | ............... 239/265.39 |
| 5,110,050 A | * | 5/1992 | Nightingale | ........... 239/265.39 |
| 5,215,257 A | * | 6/1993 | Barcza | ................... 239/265.39 |
| 5,232,158 A | * | 8/1993 | Barcza | ................... 239/265.35 |
| 5,261,605 A | * | 11/1993 | McLafferty et al. | ... 239/265.35 |
| 5,269,467 A | * | 12/1993 | Williams et al. | ........ 239/265.41 |
| 5,285,637 A | * | 2/1994 | Barcza | ................... 239/265.35 |
| 5,437,411 A | * | 8/1995 | Renggli | ................. 239/265.39 |
| 5,484,105 A | * | 1/1996 | Ausdenmoore et al. | .. 239/127.3 |
| 5,485,959 A | * | 1/1996 | Wood et al. | ........... 239/265.41 |
| 5,676,312 A | * | 10/1997 | Lapergue et al. | ...... 239/265.19 |
| 5,683,034 A | * | 11/1997 | Johnson et al. | ........ 239/265.35 |
| 5,779,152 A | * | 7/1998 | Renggli et al. | ........ 239/265.33 |
| 5,794,850 A | * | 8/1998 | Gutierrez, Jr. | ........... 239/127.1 |
| 5,839,663 A | * | 11/1998 | Broadway et al. | ..... 239/265.35 |
| 6,745,570 B1 | * | 6/2004 | Renggli et al. | ................ 60/771 |
| 6,935,118 B1 | * | 8/2005 | Gould et al. | ................... 60/771 |
| 2002/0079404 A1 | | 6/2002 | Schroeder et al. | |
| 2005/0132709 A1 | * | 6/2005 | Gould et al. | ................... 60/771 |
| 2005/0210861 A1 | * | 9/2005 | Bush et al. | ................... 60/204 |

FOREIGN PATENT DOCUMENTS

EP 0 622 538 11/1994

* cited by examiner

*Primary Examiner*—William H. Rodriguez
(74) *Attorney, Agent, or Firm*—Oblon, Spivak, McClelland, Maier & Neustadt, P.C.

(57) ABSTRACT

A controlled hot flap shutter for a turbojet nozzle includes a friction surface made of metal, and including straight lateral flanks to reduce the gap between each controlled hot flap shutter and the tracking flap shutters adjacent thereto.

6 Claims, 4 Drawing Sheets

TURBOJET AXISYMMETRIC NOZZLE CONTROLLED HOT FLAP SHUTTER

FIELD OF THE INVENTION

The invention relates to a variable ejection cross-section ejection nozzle, mounted on the downstream end of a fixed circular cross-section structure of a turbojet hot gas ejection channel, particularly for military aircraft.

STATE OF THE PRIOR ART AND PROBLEM THAT ARISES

Some military aircraft equipped with turbojets must be able to carry out missions under subsonic or supersonic flight conditions. Therefore, these turbojets are equipped with a heating system and an axisymmetric or other type nozzle, two-dimensional, for example. For turbo-engines equipped with heating systems, the nozzle must have a variable cross-section. As a result, the flap shutters of the inner ejection channel, referred to as "hot flap shutters", are therefore each mounted pivoting around an axis perpendicular to the turbojet axis, tangent to a diameter which is close to the ejection diameter.

Each of said flap shutters is controlled for pivoting by a common synchronized tilting device. Between each controlled hot flap shutter, there is a tracking flap shutter which is not controlled and wherein the orientation is carried out by the two controlled hot flap shutters adjacent thereto. Therefore, each tracking flap shutter has lateral parts subject to friction with a controlled hot flap shutter.

In addition, at this level of the hot gas ejection channel, there is a nozzle seal which is in contact with each of the tracking flap shutters and the controlled hot flap shutters.

However, the various pivoting movements of the flap shutters induce wear due to friction, particularly at the upstream contact zone between each flap shutter and the nozzle gasket(s). In fact, it is important to note that these flap shutters are made of a ceramic matrix composite material. However, the nozzle seals are made of metal.

In other words, rapid and mutual wear problems relating to the nozzle seal and the flap shutter friction surface, due to relative friction, occur at the trailing edge of the nozzle and the flap shutter hinge pin, thus affecting the service life of the nozzle components.

In addition, the use of ceramic matrix composite materials requires these flap shutters to only have very low radii of curvature, i.e. angular shapes. This is a drawback for the tightness between each tracking flap shutter and said two adjacent controlled hot flap shutters. In effect, with reference to FIG. 1, while the tracking flap shutter 1 may have a compact shape, this is not the case for the controlled hot flap shutter 2 which takes on a deformed sheet shape. This results in a relatively large gap 4 being created between the lateral edge of the tracking flap shutter 1 and the surface of the controlled hot flap shutter 2 and the external surface of the nozzle seal 3.

The invention aims to remedy these drawbacks.

SUMMARY OF THE INVENTION

To this end, the main subject of the invention is a turbojet axisymmetric nozzle controlled hot flap shutter, pivoting around an axis perpendicular to the turbojet axis, comprising:

a ceramic composite material flap shutter plate; and a friction surface placed widthways under the flap shutter plate and intended to remain in contact with a nozzle seal, said seal being made of metal.

According to the invention, the friction surface is made of metal.

In this way, the metal/metal contact of said surface with respect to the nozzle seal generates much less wear at this point.

In order to improve the tightness between a tracking flap shutter, the adjacent control hot flap shutter and the nozzle seal, the friction surface is limited laterally by two lateral flanks roughly perpendicular to the friction surface and intended to be positioned opposite and close to the lateral flanks of the adjacent tracking flap shutters.

In a first preferential embodiment of the invention, the friction surface is integrated in the controlled hot flap shutter.

Preferentially, this integration of the friction surface in the controlled hot flap shutter is carried out during the casting of the controlled hot flap shutter.

In a second embodiment, the friction surface is an added part attached to the controlled hot flap shutter.

In this case, the attachment may be made using assembly screws holding a friction surface support part between the flap shutter plate and a flap shutter frame.

BRIEF DESCRIPTION OF FIGURES

The invention and its different technical characteristics will be understood more clearly on reading the following detailed description of two embodiments of the invention.

They are accompanied by several figures representing respectively.

DETAILED DESCRIPTION OF TWO EMBODIMENTS OF THE INVENTION

Figure 2:
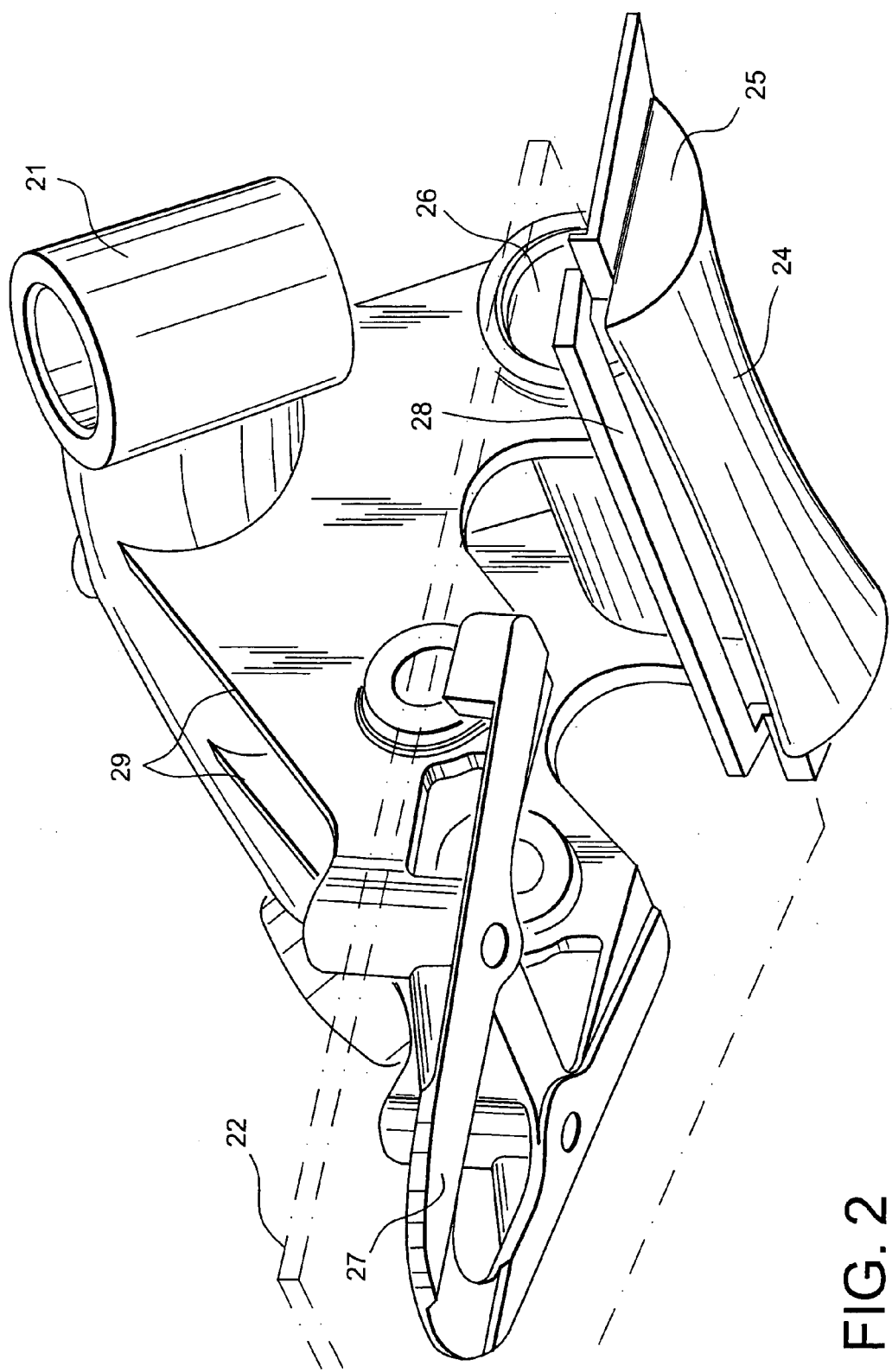
FIG. 2, a cavalier view of a controlled hot flap shutter according to a first embodiment of the invention.

With reference to FIG. 2, a first embodiment of the controlled hot flap shutter is as follows. A main body 29 opposite two parallel reinforcements supports on each side a bush 21 intended to receive the flap shutter control lever. The lower part of the body 29 comprises a pivoting hole 26 around the axis from which the flap shutter pivots. The lower part also comprises a bearing plate 27 intended to receive the additional shape of a flap shutter plate 22 consisting of a heat-resistant material such as a ceramic matrix composite. The rear lower part, just below one end of the flap shutter plate 22, comprises a tapered friction surface 24, with a slightly convex cross-section. In addition, length ways, it is slightly dished so as to show a slightly concave shape widthways on the flap shutter. It is limited laterally by two lateral flanks 25 which are perpendicular to the tapered shape shown by said friction surface 24.

In this embodiment, the flap shutter plate 22 is an integral part of the flap shutter. In effect, it is inserted into a groove 28 above the friction surface 24 and is attached during the manufacture of the bearing plate 27 of the flap shutter, particularly during the casting. A large proportion of the controlled hot flap shutter is made of metal, while the flap shutter plate 22 is made of ceramic matrix composite material.

Figure 1:
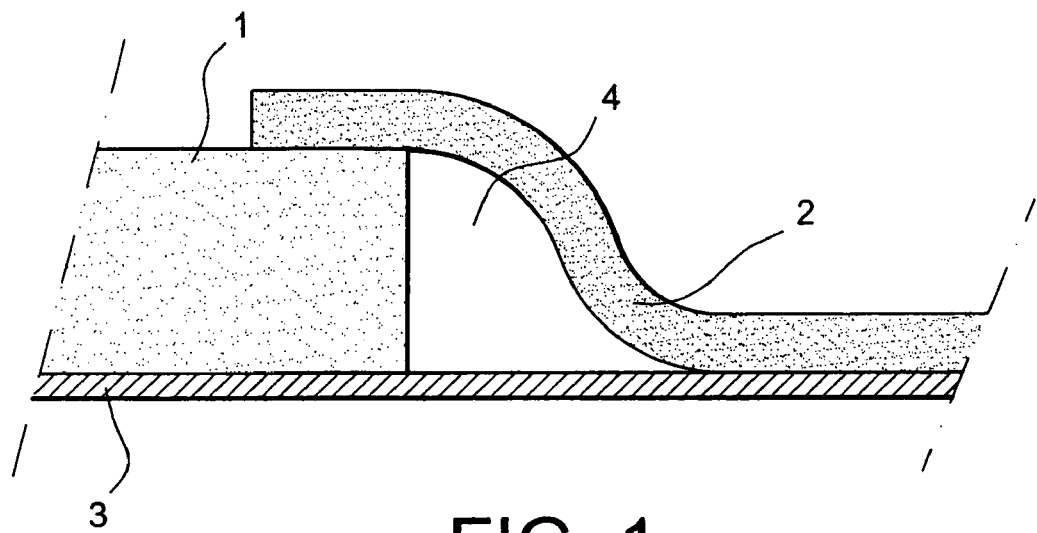
FIG. 1, a sectional view, already described, of the junction between a tracking flap shutter and a controlled hot flap shutter according to the prior art.
Figure 4:
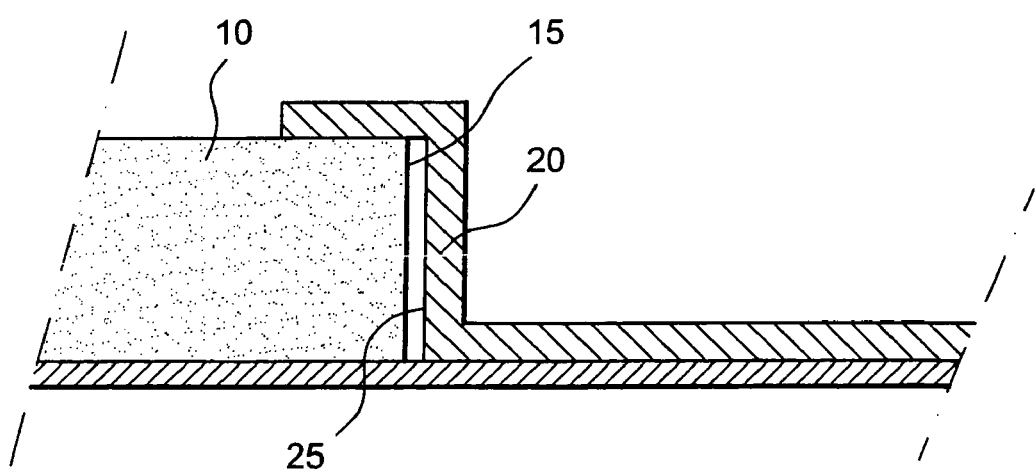
FIG. 4, an exploded view of a controlled hot flap shutter according to a second embodiment of the invention.
Figure 3:
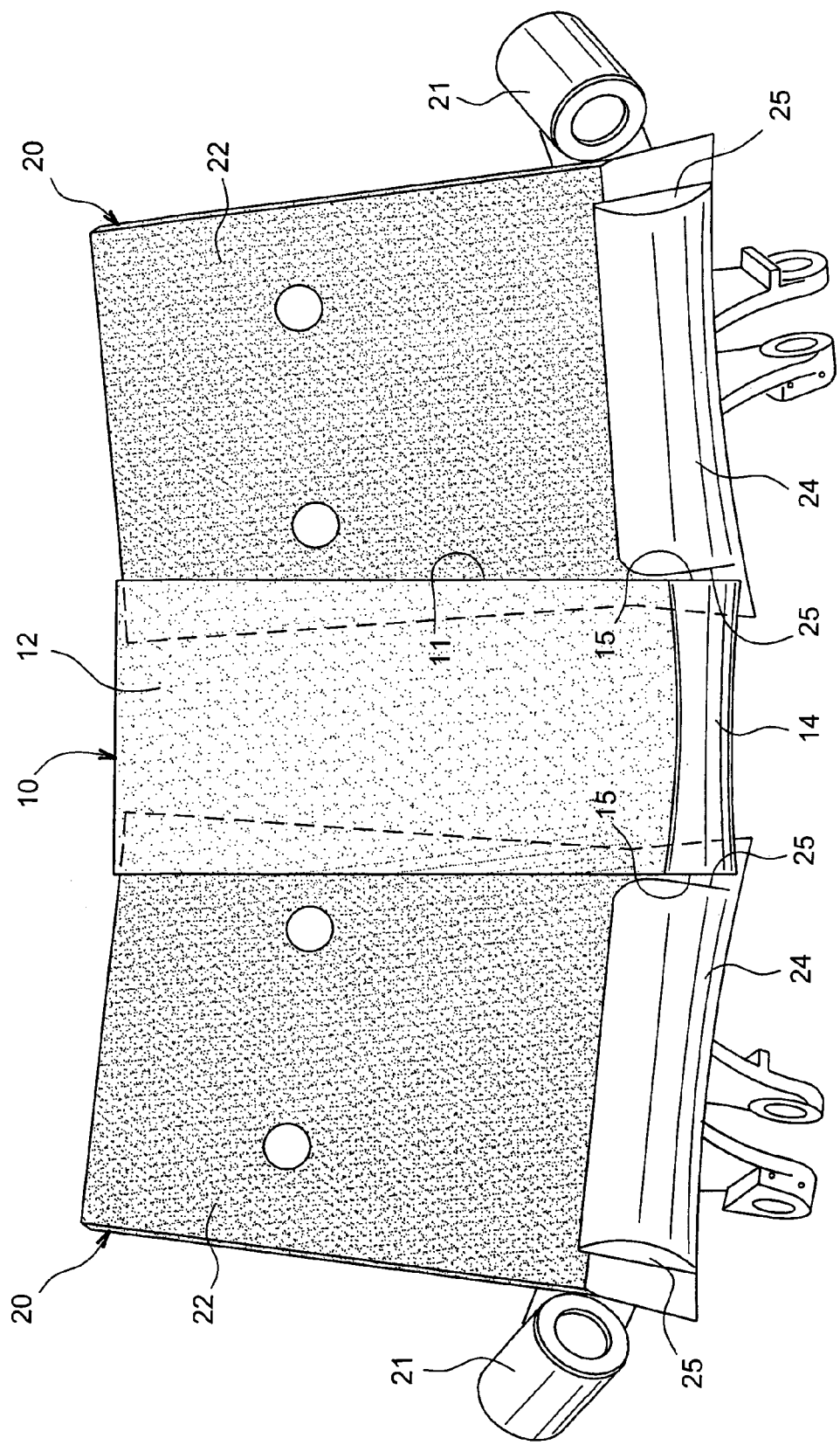
FIG. 3, two controlled hot flap shutters surrounding a tracking flap shutter according to the first embodiment of the invention.

FIG. 3 contains two controlled hot flap shutters 20 surrounding a tracking flap shutter 10. Each flap shutter plate 22 of the controlled hot flap shutters 20 laterally overlaps the corresponding flap shutter plate 12 of the tracking flap shutter 10. In order to improve the tightness of all the flap shutter bases, at their friction surface 24 for the controlled hot flap shutters 20 and 14 for the tracking flap shutters 10, the edges or lateral flanks 25 of each friction surface 24 of the controlled hot flap shutters 20 must be located as close as possible to the corresponding adjacent lateral flanks 15 of the adjacent tracking flap shutters 10. However, given that the lateral flanks 25 of the friction surfaces 24 are perpendicular to said surfaces, as a result, at each flap shutter plate 22, the lateral flanks 25 of the controlled hot flap shutters 20 and the lateral flanks 15 of the tracking flap shutters 10 can be positioned opposite each other while being practically parallel and therefore very close. FIG. 4 allows a clearer understanding, compared to FIG. 1, of the improvement of the tightness at this point. In effect, the lateral flanks 15 of the tracking flap shutters 10 and 25 of the controlled hot flap shutters 20 are very close to each other and the gap 4 in FIG. 1 is considerably reduced, which improves the tightness of the assembly at this point.

Figure 5:
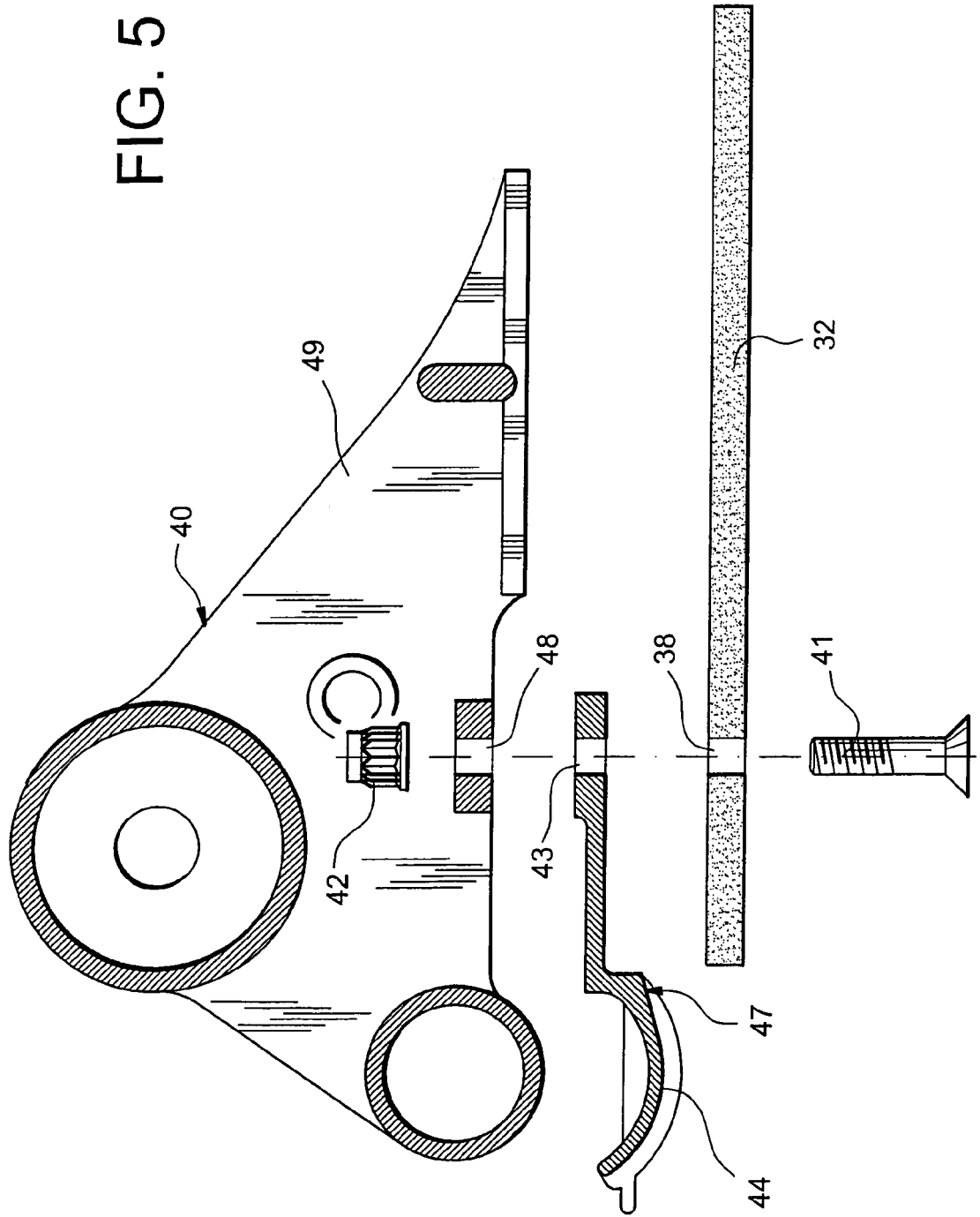
FIG. 5, the junction between a tracking flap shutter and a controlled hot flap shutter according to the invention.

The embodiment represented in FIG. 5 shows a flap shutter plate 32 which is intended to be attached to its controlled hot flap shutter 40 by means of several assembly screws 41 and nuts 42. In this case, the contact surface 44 is supported by a support part 47 which is not attached to the frame 49 of the controlled hot flap shutter 40 during the manufacture thereof. On the contrary, it represents a separate part and is machined to form an added metal part. It is easy to envisage that, with attachment means, such as assembly screws 41, corresponding nuts 42 and passage holes 43 in the support part 47, 48 in the controlled hot flap shutter frame 49 and 38 in the flap shutter plate 32, the assembly can be attached and disassembled independently from the manufacture of the assembly.

Naturally, the geometry of the support part 47 and of the friction surface 44 and the lateral flanks in particular must correspond to those described above in the first embodiment. In this second embodiment, the same advantages related to wear on the friction surfaces 44, with respect to the nozzle seal and gasket at the same point, are obtained.

The invention claimed is:

1. Turbojet axisymmetric nozzle controlled hot flap shutter, pivoting around an axis perpendicular to the turbojet axis, comprising:
   a ceramic composite material flap shutter plate; and
   a friction surface placed widthways under the flap shutter plate and intended to remain in contact with a nozzle seal, said seal being made of metal,
   wherein the friction surface is made of metal.

2. Controlled hot flap shutter according to claim 1, wherein the friction surface is limited by two lateral flanks, roughly perpendicular to the friction surface and intended to be positioned opposite and close to the lateral flanks of an adjacent tracking flap shutter.

3. Controlled hot flap shutter according to claim 1, wherein the friction surface is integrated in the controlled hot flap shutter.

4. Controlled hot flap shutter according to claim 3, wherein the friction surface is integrated in a frame during the casting of the controlled hot flap shutter.

5. Controlled hot flap shutter according to claim 1, wherein the friction surface is supported by a support part which is added and attached to the controlled hot flap shutter.

6. Controlled hot flap shutter according to claim 5, wherein the support part is attached between a frame of the controlled hot flap shutter and the flap shutter plate by assembly screws.

* * * * *